Figure 1:
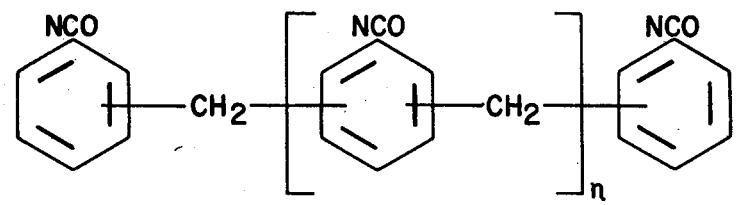

United States Patent [19]

Moss

[11] 4,316,935
[45] Feb. 23, 1982

[54] POLYISOCYANURATE FOAM AND LAMINATES THEREOF AND PROCESS FOR PRODUCING THEM

[75] Inventor: Ernest K. Moss, Clearwater, Fla.

[73] Assignee: The Celotex Corporation, Tampa, Fla.

[21] Appl. No.: 206,912

[22] Filed: Nov. 14, 1980

Related U.S. Application Data

[63] Continuation-in-part of Ser. No. 19,374, Mar. 12, 1979, abandoned.

[51] Int. Cl.³ .................... C08G 18/62; C08G 18/76; B32B 27/00
[52] U.S. Cl. .................... 428/304.4; 521/112; 521/125; 521/137; 521/170; 521/174; 521/902; 526/270; 528/249; 428/422.8
[58] Field of Search .................... 428/310, 422.8; 521/137, 170, 174, 112, 125, 902; 528/249; 526/270

[56] References Cited

U.S. PATENT DOCUMENTS

| | | | |
|---|---|---|---|
| 2,343,972 | 3/1944 | Harvey | 528/249 |
| 2,601,497 | 1/1952 | Brown | 528/249 |
| 3,940,517 | 2/1976 | De Leon | 521/118 |
| 4,017,461 | 4/1977 | Dunlop et al. | 528/249 |
| 4,029,611 | 6/1977 | Cenker et al. | 521/902 |

FOREIGN PATENT DOCUMENTS

| | | |
|---|---|---|
| 834468 | 4/1976 | Belgium . |
| 2546183 | 7/1976 | Fed. Rep. of Germany . |
| 1433641 | 4/1976 | United Kingdom . |

OTHER PUBLICATIONS

"FaRez B260" Technical Data Sheet, Quaker Oats Co., Chicago, Oct. 1978, 6 pages.

Theoni et al.–Jour. Cell Plast., Nov./Dec. 1971, pp. 294-301.
Bozer et al. 33rd Annual Tech. Conf. 1978, Soc. Plast. Industry, Sec. 6-B, pp. 1-8.
Translation of Belgium 834,468.

*Primary Examiner*—H. S. Cockeram
*Attorney, Agent, or Firm*—James W. Grace; Charles W. Vanecek

[57] ABSTRACT

A foam characterized by the presence of isocyanurate groups which is the reaction product of a polymethylene polyphenyl isocyanate, such as that of the formula:

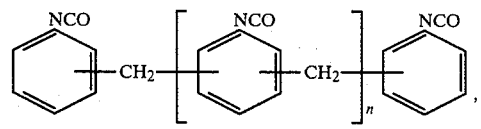

wherein n is an integer from 1 to 8 inclusive, and a furan resin of the formula:

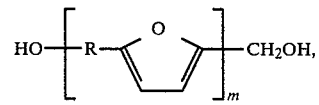

wherein R is $-CH_2-$ or $-CH_2-O-CH_2-$, and the average value of m is such that the furan resin has a viscosity of up to 50,000 centipoises at 25° C. The foam exhibits a low friability and an improved capacity to maintain its structural integrity when exposed to fire, and can be used in structural laminates.

17 Claims, 4 Drawing Figures

POLYISOCYANURATE FOAM AND LAMINATES THEREOF AND PROCESS FOR PRODUCING THEM

This is a continuation-in-part of application Ser. No. 019,374, filed Mar. 12, 1979 now abandoned.

TECHNICAL FIELD

This invention relates to the technical field of polyisocyanurate foams, laminates thereof and processes for producing them.

BACKGROUND ART

Polyisocyanurate foams are well known, and are described for example in U.S. Pat. Nos. 3,903,346; 3,940,517; and 4,028,158 and United Kingdom Specification No. 1,433,641. German Offenlegungsschrift No. 2,546,183 published July 1, 1976, reportedly corresponding to U.S. Application Ser. No. 534,559 filed Dec. 19, 1974 relates to the production of polyisocyanurate foams employing furfuryl alcohol.

However, many such polyisocyanurate foams exhibit an undesirably high friability. This high friability results in a foam that is dusty, and which has low compressive strength and low tensile strength.

Furthermore, many prior polyisocyanurate foams suffer from a lack of structural integrity when exposed to fire. Although all such polyisocyanurate foams burn to a certain extent, it is highly desirable that the fully burned foam maintain its structural integrity in order to inhibit flame propagation and in order to pass certain standards.

Accordingly, it is an object of the present invention to provide an improved polyisocyanurate foam having a reduced friability.

Another object of the present invention is to provide an improved polyisocyanurate foam that maintains its structural integrity when it burns. Another object is to provide a process for producing an improved polyisocyanurate foam. Additional objects and advantages of the present invention will be apparent to those skilled in the art by reference to the following detailed description.

BRIEF DESCRIPTION OF THE INVENTION

According to the present invention, there is provided a foam characterized by the presence of isocyanurate groups which foam is the reaction product of polymethylene polyphenyl isocyanate and a furan resin.

THE DRAWINGS

The invention may be better understood by reference to the drawings wherein

Figure 2:
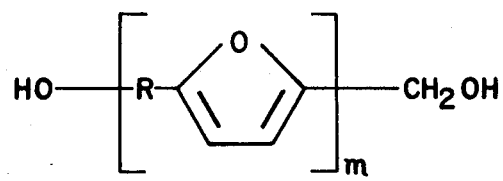
Figure 3:
Figure 4:
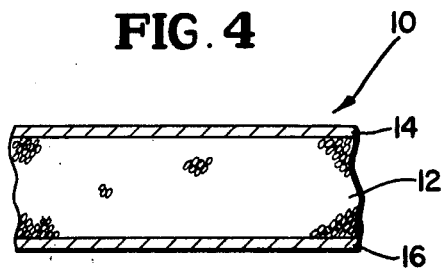

FIG. 1 is Formula I and shows a preferred class of polymethylene polyphenyl isocyanates especially useful in the present invention; and FIG. 2 is Formula II and shows a preferred class of furan resin especially useful in the present invention; and FIG. 3 is Formula III which is 2,5-bis(hydroxymethyl) furan, and FIG. 4 is a sectional view of a structural laminate employing the polyisocyanurate foam of the present invention.

BEST MODE OF CARRYING OUT THE INVENTION

In the broadest aspects of the present invention, any polymethylene polyphenyl isocyanate can be employed. However, the preferred polymethylene polyphenyl isocyanate is that of Formula I wherein n is an integer from 1 to 8 inclusive. The preferred polymethylene polyphenyl isocyanate contains less than 30 percent by weight diphenylmethane diisocyanate based on the total weight of polymethylene polyphenyl isocyanate. Further, it has an NCO equivalent weight of 136 to 142. A preferred polymethylene polyphenyl isocyanate is disclosed and described in CELOTEX U.K. Specification No. 1,433,641.

In the broadest aspects of the present invention, any furan resin can be employed which has a viscosity of up to 50,000 centipoises at 25° C. and whose molecules have one or more furan rings and two hydroxyl groups. The preferred difunctional furan resin is that of generalized Formula II shown in FIG. 2 wherein R is —$CH_2$— or —$CH_2$—O—$CH_2$— and m for each resin molecule is an integer from 1 to 10 inclusive, and is preferably from 1 to 8 inclusive. Although the average value of m for the aggregate of all resin molecules can be any number within these limits, m preferably has an average value of 1.5 to 3.0. The furan resin which is especially useful in this invention can have a viscosity of 5,000 to 50,000 centipoises at 25° C. and preferably has a viscosity of 8,000 to 45,000 centipoises at 25° C. (measured with a Brookfield viscometer).

An especially useful subclass of furan resin is a mixture of 25 to 40 weight percent 2,5-bis hydroxymethyl furan of Formula III; wherein the balance of the difunctional mixture is furan resin of general Formula II wherein m for each resin molecule is 2 to 10 inclusive; wherein the weight percent is based on the total weight of furan resin present in the foam.

The equivalent weight of the furan resin is determined by reference to the hydroxyl groups present and can be calculated or determined experimentally by any convenient technique such as by the measurement of the hydroxyl number as determined by the Zerewitinoff Test. This equivalent weight falls between about 65 and 250 g/mole OH and preferably between 85 and 150 g/mole OH.

The furan resin useful in the present invention is a known resin supplied by the Quaker Oats Company under the tradename FaRez B-260. For example, it is disclosed in Technical Bulletin No. 186, The Quaker Oats Company Chemical Division, wherein important physical and chemical properties of the resin are set forth, and in the article "Furan Resinous Cements," appearing in the ACS publication Plastic Mortars, Sealants, and Caulking Compounds (1979) Series No. 113. (copies of which references are enclosed herewith as Exhibits A and B). These two references are incorporated herein by reference. It is also described by Bozer et al., "Effectiveness of Flame Retardant Additives in Furan Resins" in the Publication entitled 33rd Annual Technical Conference published by the Society of Plastics Industry, Inc. on Feb. 7-10, 1978, Sec 6-B, Pages 1-8.

The furan resin FaRez B-260 is prepared by polymerizing bis(hydroxymethyl) furan to yield a highly reactive, polyfunctional polymer having general Formula II wherein the average value of m or degree of polymerization is such that the viscosity of the resin can be as high as 200,000 centipoises at 25° C. A preferred FaRez B-260 furan resin for use in the present invention has a viscosity of up to 50,000 centipoises. Typically, the viscosity of the furan resin employed in this invention is about 8,000 to 45,000 centipoises.

As the above article "Furan Resinous Cements" reveals, FaRez B-260 can contain a minor amount of less reactive polyfurfuryl alcohol homologs. However, the majority of the resin, i.e., at least 85%, consists of highly reactive, polyfunctional homologs of general Formula II. A broad formula for FaRez B-260, generalized to include the polyfurfuryl alcohol homologs, is as follows:

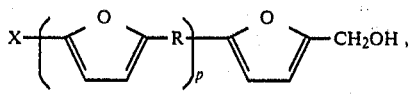

wherein R is —CH$_2$— or —CH$_2$—O—CH$_2$—, X is H— or HOCH$_2$—, and, when X is H—, R is —CH$_2$— and p is 0, 1, 2 or 3; and, when X is HOCH$_2$—, R is —CH$_2$— or —CH$_2$—O—CH$_2$— and the average value of p or the degree of polymerization is such that the viscosity of the resin is up to 200,000 centipoises.

It has been found that FaRez B-260 contains unreacted 2,5-bis(hydroxymethyl) furan. A typical weight percent of 2,5-bis(hydroxymethyl) furan found in samples of FaRez B-260 is about 35 to 40 weight percent. This content can be increased by blending 2,5-bis(hydroxymethyl) furan into a previously polymerized batch of FaRez B-260. The content can decrease with continuing self-polymerization within the furan resin.

The polymethylene polyphenyl isocyanate and the furan resin can be reacted with each other in widely varying equivalent ratios. However, the polymethylene polyphenyl isocyanate is preferably present in a stoichiometric excess in order to ensure the presence in the foam of isocyanurate groups. In general, the equivalent ratio of polymethylene polyphenyl isocyanate to furan resin is 2:1 to 7:1 and preferably 3:1 to 6:1.

The foams of the present invention are produced by a process which comprises the steps of forming a reaction mixture comprising and preferably consisting essentially of polymethylene polyphenyl isocyanate, furan resin, a blowing agent, a catalyst, and a surfactant. The reaction mixture is then permitted to react, thereby forming the foam.

Any blowing agent characteristically employed in similar prior art products can be employed in the composition of the present invention. In general, these blowing agents are liquids having a boiling point between minus 50° C. and plus 100° C. and preferably between 0° C. and 50° C. Examples of suitable blowing agents include, among others, chlorinated and fluorinated hydrocarbons such as CCl$_2$FCClF$_2$, CCl$_2$FCF$_3$ and fluorotrichloromethane which is the preferred blowing agent. The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20, weight percent of the composition. When the blowing agent has a boiling point at or below ambient, it is maintained under pressure until mixed with the other components. Alternatively, it can be maintained at subambient temperatures until mixed with the other components. Difluorodichloromethane is the preferred blowing agent having a boiling point outside of the preferred range but within the broad range.

Any catalyst known to catalyze the trimerization of isocyanates to form isocyanurates can be employed in the present invention. The preferred catalyst is a mixture of equivalent amounts of 2,4,6-tris(dimethylaminomethyl) phenol and potassium-2-ethyl hexoate, the synthesis and use of which is described in United Kingdom Specification No. 1,433,644. Another catalyst system is that employing an epoxide, an N-substituted aziridine, and a tertiary amine. The synthesis and use of such a catalyst is described in U.S. Pat. No. 3,799,896.

The catalyst in the present invention is employed in an amount necessary to give the desired cream times, firm times and tack-free times and generally comprises from 0.1 to 20, and preferably from 0.3 to 10, weight percent of the total composition.

Successful results have been obtained with silicone-/ethylene-oxide/propylene-oxide copolymers as surfactants. The surfactant molecules act as nucleating points from which bubbles can be initially formed and they further stabilize the bubbles after formation to allow preparation of foam. Among the many surface-active materials mentioned in the patent literature as cell-size control agents and stabilizers for such foams are alkoxy silanes, polysilylphosphonates, polydimethyl siloxane and polydimethyl-siloxane-polyoxyalkylene block copolymers. For a more detailed explanation of the function of the surfactant in the manufacture of foamed polyurethane and polymethylene polyphenyl isocyanate compounds, reference is made to an article entitled "How Silicone Surfactants Affect Polyurethane Foams" in *Modern Plastics*, January, 1967 edition, Pages 133ff, of which Robert J. Boudreau is the author.

Examples of surfactants useful in the present invention include, among others, polydimethylsiloxane-polyoxyalkylene block copolymers available from the Union Carbide Corporation under the tradenames "L-5420" and "L-5410" and from the Dow Chemical Corporation under the tradename "DC-193".

The surfactant generally comprises from 0.05 to 4, and preferably comprises from 0.1 to 2, weight percent of the composition.

The invention may be better understood by reference to the following examples wherein all parts and percentages are by weight unless otherwise indicated. These examples are intended to be illustrative rather than limiting. They are furthermore designed to represent the best mode presently contemplated for practicing the present invention.

EXAMPLE 1

This example is illustrative of the present invention. The following quantities of the following ingredients are combined as indicated:

| Item | Ingredient | Quantity (grams) |
|---|---|---|
| A | polymethylene polyphenyl isocyanate | 265 |
| B | furan resin | 35 |
| C | fluorotrichloromethane | 50 |
| D | catalyst composition of Example 22A | 20 |
| E | surfactant | 6 |

Items A, B, C, and E are mixed together in one vessel whereupon item D is added to the vessel with rapid stirring. A polyisocyanurate foam results.

Polymethylene polyphenyl isocyanate employed herein as item A contains about 26.5 weight percent diphenylmethane diisocyanate, has an NCO equivalent weight between 138 and 140, and has a viscosity of 1,000 centipoises measured at 25° C., and is that supplied by the Mobay Chemical Company under the tradename E-468. The equivalent ratio of A:B was 5.4:1.

The furan resin employed herein as item B is that supplied by the Quaker Oats Company under the tradename FaRez B-260. The equivalent weight was 99 g/mole OH.

The surfactant employed in this example is that supplied by the Dow Chemical Corporation as "DC 193" and is an ethylene oxide-propylene oxide adduct of polydimethyl-siloxane.

Table I entitled "CHAR TEST" lists in Column 1 the examples.

In Column 2, the examples are designated either inventive (I) or comparative (C). Column 3 shows the viscosity of the furan resin at 25° C., in centipoises (cps). The polymethylene polyphenyl isocyanate used was either NONDUR MR 200 or E-468 supplied by the Mobay Chemical Company. Column 4 shows the weight percent of isocyanurate groups calculated to be present in the foam.

Columns 5 and 6 show the initial temperatures of the isocyanate and the furan resin or comparative alcohol, respectively, in degrees Centigrade. Column 7 shows the amount of catalyst used in grams per 300 grams of combined isocyanate plus furan resin or comparative alcohol.

Column 8, 9 and 10 show the time in seconds of the reactivity profile of the foam forming process. This reactivity profile comprises the cream time, firm time and tack-free time of the foam. A description of cream time, firm time and tack-free time is given in United Kingdom's Specification No. 1,433,641.

Column 11 shows the exotherm in degrees Centigrade, which is the maximum temperature attained during the exothermic foam forming process.

Column 12 shows the density of the foam produced in the process in pounds per cubic foot. Column 13 shows the friability of the foam produced in the instant process as the propensity of the foam to break expressed in percent weight loss. This friability is determined by the ASTM C-421 friability test conducted for ten minutes.

Columns 14 and 15 show the results of the char test performed on the foam. The sample size for this char test was selected to allow the whole sample to be uniformly bathed in the flame.

A sample of size 1 inch by 2 inches by 2 inches (2.5 centimeters by 5 centimeters by 5 centimeters) is chosen for the char test. The sample is weighed and then measured to the nearest millimeter for length, width and height. The sample was then exposed to the flame, being held 5 centimeters above the flame for 2 minutes with the flame impinging on the 2×2 inch surface. After cooling, the charred sample was weighed and the length, width and height were again determined (if possible). Three samples were taken for each example. The average percentage weight retained of the samples is shown in Column 14. Column 15 shows the average percentage of the volume retained. The flame source was a Fisher Burner whereby the measured heat flux was 12–15 watts/cm$^2$. Heat flux was determined with a total heat flux calorimeter (C-1300) manufactured by Hycal Engineering, Santa Fe Springs, Calif.

To show the reproducibility of this char test, ten samples of the same foam were tested. The average weight and volume retained and their standard deviation and range are shown in Table II.

TABLE II

| | |
|---|---|
| Number of samples | 10 |
| Average percent weight retained | 36.6 |
| Standard deviation | ± 1.14 |
| Range | 35.7–38 |
| Average percent volume retained | 49.4 |
| Standard deviation | ± 1.42 |
| Range | 47.3–51.3 |

Column 16 of Table I shows the thermal conductivity of the resultant foam in BTU-in./hr°F. ft$^2$.

EXAMPLES 2–6

These examples are illustrative of the present invention, the procedure of Example 1 being followed except that the furan resin had the viscosity shown in Column 3 of Table I. Furan resin equivalent weights were 99 to 107 g/mole OH.

EXAMPLE 7

This example is illustrative of the present invention employing a slightly different A:B ratio. The procedure of Example 1 is repeated employing the same quantities of the same ingredients except that the amount of polymethylene polyphenyl isocyanate is reduced to 250 grams and the amount of furan resin is increased to 50 grams, a resin of viscosity of 15,000 centipoises being used. The resultant product is a polyisocyanurate foam. The equivalent ratio of A:B was 3.5:1.

EXAMPLES 8–12

These examples are illustrative of the present invention, the procedure of Example 7 being followed except the resin viscosities were those shown in Column 3 of Table I.

EXAMPLE 13

This example is illustrative of the present invention employing a slightly different A:B ratio. The procedure of Example 1 is repeated employing the same quantities of the same ingredients except that the amount of polymethylene polyphenyl isocyanate is reduced to 225 grams and the amount of furan resin is increased to 75 grams, a resin of viscosity of 15,000 cps being used. The equivalent ratio of A:B was 2:1.

EXAMPLES 14–18

These examples are illustrative of the present invention, the procedure of Example 13 being followed except the resin viscosities were those shown in Column 3 of Table I.

EXAMPLES 19–22

These examples are given for comparison with those of the present invention. Twenty-three grams of diethylene glycol were reacted with 277 grams of polymethylene polyphenyl isocyanate having the tradename "E-468" according to the procedure of Example 1. The equivalent ratio of A:B was 4.5:1. The results obtained are shown in Table I.

As shown by comparison of the char test results in Table I, all inventive samples displayed uniform and measurable volume changes whereas the samples employed in comparative Examples 19-22 were distorted, swelled and cracked. The inventive samples also displayed a desirably lower average friability in contrast to the comparative samples.

EXAMPLE 22A

This example illustrates the synthesis of a catalyst composition useful in the present invention.

The following quantities of the following ingredients are combined as indicated:

| Item | Ingredient | Parts by Weight |
|---|---|---|
| A | 2,4,6,-tris (dimethylaminomethyl) phenol | 1 |
| B | potassium octoate solution | 3 |
| C | polyoxyethylene glycol | 8 |

Items A, B and C are combined as indicated in Example III of U.S. Pat. No. 3,940,517.

Item A is that supplied by the Rohm and Haas Company under the trademark "DMP-30".

The potassium octoate in Item B is potassium-2-ethylhexoate and is present as a 70 weight percent solution in PEG 200 as defined below.

Item C, the polyoxyethylene glycol is the ethylene oxide adduct of ethylene glycol having an average molecular weight of 200, a specific gravity of 1.27±0.002 at 20° C., a refractive index of 1.459±0.003 at 25° C., and a hydroxyl number of 560. It is supplied by the Union Carbide Corporation as PEG 200.

EXAMPLES 23-25

These examples are given for comparison with those of the present invention. In Example 23, 29 grams of furfuryl alcohol was reacted with 271 grams of polymethylene polyphenyl isocyanate according to the procedure of Example 1. The equivalent ratio of A:B was 6.5:1. In Example 24, 35 grams of furfuryl alcohol was reacted with 265 grams of the same isocyanate according to the procedure of Example 1. The equivalent ratio of A:B was 5.3:1. In Example 25, 50 grams of furfuryl alcohol was reacted with 250 grams of polyisocyanate according to the procedure of Example 1. The equivalent ratio of A:B was 3.5:1. The results are shown in Table I.

As can be seen by comparison with the illustrative examples, substitution of furfuryl alcohol for furan resin gave an undesirably high friability despite the excellent volume and weight retention.

INDUSTRIAL APPLICABILITY

Referring now to FIG. 4, there is shown a structural laminate 10 of the present invention. The structural laminate 10 comprises a polyisocyanurate foam core 12 fixedly attached to an upper facing sheet 14 and a lower facing sheet 16. The structural laminate 10 can be produced as described in U.S. Pat. No. 3,940,517 in general and in particular in Example VI thereof, wherein the diethylene glycol is replaced by the furan resin of the invention.

Although the invention has been described in considerable detail with reference to certain preferred embodiments thereof, it will be understood that variations and modifications can be effected within the spirit and scope of the invention as described above and as defined in the appended claims.

TABLE I

CHAR TEST

COLUMNS 1-6

| 1. Ex. (No) | 2. Inv. or Compar. (I or C) | 3. Resin Viscosity (cps) | 4. Percent Isocyanurate (%) | 5. Temp. NCO (°C.) | 6. Temp. Resin or Alcohol (°C.) |
|---|---|---|---|---|---|
| 1 | I | 15,000 | 22 | 15 | 15 |
| 2 | I | 25,000 | 22 | 10 | 25 |
| 3 | I | 25,000 | 22 | 15 | 15 |
| 4 | I | 25,000 | 22 | 15 | 15 |
| 5 | I | 25,000 | 22 | 15 | 15 |
| 6 | I | 44,000 | 22 | 10 | 25 |
| 7 | I | 15,000 | 19 | 15 | 15 |
| 8 | I | 25,000 | 19 | 10 | 25 |
| 9 | I | 25,000 | 19 | 15 | 15 |
| 10 | I | 25,000 | 19 | 15 | 15 |
| 11 | I | 25,000 | 19 | 15 | 15 |
| 12 | I | 44,000 | 19 | 10 | 25 |
| 13 | I | 15,000 | 13 | 15 | 15 |
| 14 | I | 25,000 | 13 | 10 | 25 |
| 15 | I | 25,000 | 13 | 15 | 15 |
| 16 | I | 25,000 | 13 | 15 | 15 |
| 17 | I | 25,000 | 13 | 15 | 15 |
| 18 | I | 44,000 | 13 | 10 | 25 |
| 19 | C | — | 22 | 10 | 25 |
| 20 | C | — | 22 | 15 | 25 |
| 21 | C | — | 22 | 15 | 25 |
| 22 | C | — | 22 | 15 | 25 |
| 23 | C | — | 23 | 15 | 15 |
| 24 | C | — | 21.5 | 15 | 15 |
| 25 | C | — | 18 | 15 | 15 |

COLUMNS 1 AND 7-12

| 1. Ex. (no) | 7. Cat. (gms) | 8. Cream Time (sec) | 9. Firm Time (sec) | 10. Tack Free Time (sec) | 11. Exo. (°C.) | 12. Density (lbs/ft³) |
|---|---|---|---|---|---|---|
| 1 | 20 | 17 | 65 | >120 | — | 1.8 |
| 2 | 20 | 15 | 55 | — | — | 2.0 |
| 3 | 18 | 16 | 60-70 | — | 102 | 1.9 |
| 4 | 18 | 16 | 65 | — | — | 2.1 |
| 5 | 15 | 22 | 95 | — | — | 2.1 |
| 6 | 18 | 16 | 60 | — | 105 | 1.8 |
| 7 | 28 | 17 | 45 | 50 | — | 1.7 |
| 8 | 22 | 15 | 45 | — | 114 | 1.8 |
| 9 | 21 | 15 | 45 | 50-55 | 116 | 1.8 |
| 10 | 21 | 16 | 45 | 65 | — | 2.1 |
| 11 | 17 | 21 | 60 | 75 | — | 2.1 |
| 12 | 20 | 15 | 50 | — | — | 2.0 |
| 13 | 28 | 16 | 40 | 45 | — | 1.2 |
| 14 | 24 | 16 | 40 | — | 122 | 1.5 |
| 15 | 24 | 15 | 35 | 40 | 123 | 1.4 |
| 16 | 24 | 16 | 35 | 40 | — | 1.8 |
| 17 | 20 | 22 | 45 | 50 | — | 1.9 |
| 18 | 22 | 16 | 40 | — | — | 1.8 |
| 19 | 20 | 22 | 40 | — | 131 | 1.8 |
| 20 | 18 | 21 | 35 | 50 | — | 1.8 |
| 21 | 20 | 16 | 30 | — | — | 1.8 |
| 22 | 16 | 22 | 45 | 55 | — | 1.9 |
| 23 | 10 | 16 | 30 | 40 | — | 2.2 |
| 24 | 10 | 20 | 45 | 55 | — | 2.0 |
| 25 | 13 | 20 | 35 | 40 | — | 1.7 |

COLUMNS 1 AND 13-16

| 1. Ex. (No) | 13. Friability (%) | 14. Weight Retained (%) | 15. Volume Retained (%) | 16. Thermal Cond. (BTU-in / hr-°F.-ft²) |
|---|---|---|---|---|
| 1 | 17 | 37.6 | 53.2 | 0.137 |
| 2 | 6 | 39.7 | 54.2 | 0.134 |
| 3 | 6 | 37.3 | 49.5 | 0.137 |
| 4 | 16 | 37.8 | 53.5 | 0.141 |
| 5 | 21 | 38.1 | 55.2 | 0.135 |
| 6 | 9 | 41.2 | 55.6 | 0.137 |
| 7 | 6 | 34.7 | 47.4 | 0.130 |
| 8 | 5 | 38.3 | 53.5 | 0.141 |
| 9 | 6 | 38.4 | 51.0 | 0.130 |

TABLE I-continued
CHAR TEST

| | | | | |
|---|---|---|---|---|
| 10 | 6 | 36.8 | 51.8 | 0.128 |
| 11 | 6 | 38.0 | 53.3 | 0.135 |
| 12 | 5 | 38.6 | 49.2 | 0.147 |
| 13 | 5 | 29.6 | 32.6 | — |
| 14 | 2 | 32.5 | 35.2 | 0.140 |
| 15 | 2 | 35.0 | 44.7 | 0.133 |
| 16 | 3 | 30.6 | 27.4 | 0.154 |
| 17 | 3 | 35.2 | 42.4 | 0.130 |
| 18 | 3 | 33.3 | 37.2 | 0.140 |
| 19 | 11 | 37.7 | —* | 0.140 |
| 20 | 22 | 37.2 | —* | 0.139 |
| 21 | 18 | 38.1 | —* | 0.140 |
| 22 | 15 | 38.3 | —* | 0.139 |
| 23 | 61 | 44 | 75 | 0.139 |
| 24 | 90 | 53.5 | — | 0.141 |
| 25 | 92 | 48.5 | 80 | 0.143 |

*Distorted, unable to determine volume.

What is claimed is:

1. A foam characterized by the presence of isocyanurate groups and by a friability of no greater than 21 percent, as measured by the ASTM C-421 friability test, which is the reaction product of:
   A. polymethylene polyphenyl isocyanate and
   B. a furan resin of the formula

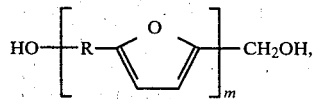

wherein R is —CH$_2$— or —CH$_2$—O—CH$_2$—, and the average value of m is such that the furan resin has a viscosity of up to 50,000 centipoises at 25° C.

2. The foam of claim 1 wherein the equivalent ratio of A:B is 2:1 to 7:1.

3. The foam of claim 1 wherein the polymethylene polyphenyl isocyanate is that of the formula

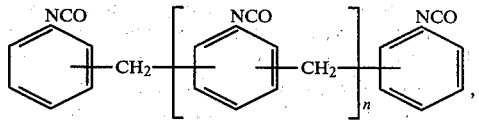

wherein n is an integer from 1 to 8 inclusive.

4. The foam of claim 1 wherein the polymethylene polyphenyl isocyanate contains less than 30 percent by weight diphenylmethane diisocyanate based on the total weight of polymethylene polyphenyl isocyanate.

5. The foam of claim 1 wherein the polymethylene polyphenyl isocyanate has an NCO equivalent weight of 136 to 142.

6. The foam of claim 1 wherein the average value of m is such that the furan resin has a viscosity of 8,000 to 45,000 centipoises at 25° C.

7. The foam of claim 1 further comprising a blowing agent in an amount sufficient to give the resultant foam the desired bulk density between 0.5 and 10 pounds per cubic foot.

8. The foam of claim 7 wherein the blowing agent comprises from 1 to 30 weight percent of the composition.

9. The foam of claim 1 further comprising 0.1 to 20 weight percent of the total composition of catalyst.

10. The foam of claim 1 further comprising 0.05 to 4 weight percent of the total composition of surfactant.

11. A foam characterized by the presence of isocyanurate groups and by a friability of no greater than 21 percent, as measured by the ASTM C-421 friability test, which is the reaction product of:
   A. polymethylene polyphenyl isocyanate of the formula

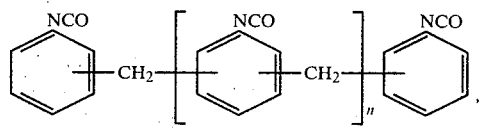

wherein n is an integer from 1 to 8 inclusive, and
   B. a furan resin of the formula

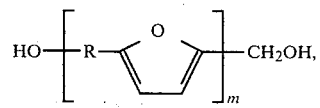

wherein R is —CH$_2$— or —CH$_2$—O—CH$_2$—, the average value of m is such that the furan resin has a viscosity of up to 50,000 centipoises at 25° C., and the equivalent ratio of A:B is 2:1 to 7:1.

12. A foam characterized by the presence of isocyanurate groups and by a friability of no greater than 21 percent, as measured by the ASTM C-421 friability test, which is the reaction product of:
   A. polymethylene polyphenyl isocyanate of the formula

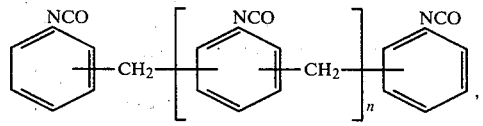

wherein n is an integer from 1 to 8 inclusive, and
   B. a furan resin comprising
      (i) 25 to 40 weight percent of 2,5-bis hydroxymethyl furan of the formula

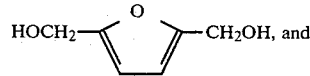

(ii) the balance of the furan resin having the formula

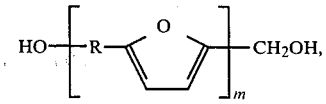

wherein R is —CH$_2$— or —CH$_2$—O—CH$_2$—, and the average value of m is such that the furan resin has a viscosity of up to 50,000 centipoises at 25° C., and
wherein the equivalent ratio of A:B is 2:1 to 7:1.

13. A foam characterized by the presence of isocyanurate groups and by a friability of no greater than 21 percent, as measured by the ASTM C-421 friability test, which is the reaction product of:

A. polymethylene polyphenyl isocyanate of the formula

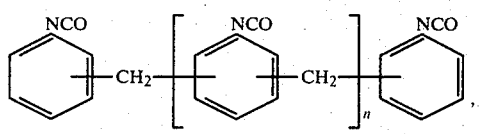

wherein n is an integer from 1 to 8 inclusive, wherein the polymethylene polyphenyl isocyanate contains less than 30% by weight diphenylmethane diisocyanate based on the total weight of polymethylene polyphenyl isocyanate, and wherein the polymethylene polyphenyl isocyanate has an NCO equivalent weight of 136 to 142, B. a furan resin of the formula

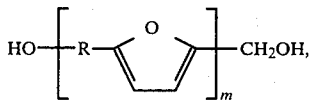

wherein R is —CH$_2$— or —CH$_2$—O—CH$_2$—, and the average value of m is such that the furan resin has a viscosity between 8,000 and 45,000 centipoises at 25° C., C. a blowing agent comprising fluorotrichloromethane in an amount sufficient to give the resultant foam a bulk density of 1 to 5 pounds per cubic foot, D. a catalyst comprising 2,4,6-tris (dimethylaminomethyl) phenol and potassium-2-ethyl hexoate in an amount necessary to give the desired reactivity profile, comprising from 0.3 to 10 weight percent of the total composition, and E. a surfactant comprising a polydimethyl siloxanepolyoxyalkylene block copolymer, comprising from 0.1 to 2 weight percent of the composition, wherein the equivalent ratio of A:B is 3:1 to 6:1.

14. A process for producing foam characterized by the presence of isocyanurate groups and by a friability of no greater than 21 percent, as measured by the ASTM C-421 friability tests, said process comprising the steps of:

I. forming a reaction mixture of:
A. polymethylene polyphenyl isocyanate,
B. a furan resin of the formula

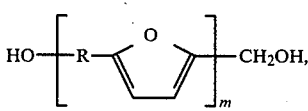

wherein R is —CH$_2$— or —CH$_2$—O—CH$_2$—, and the average value of m is such that the furan resin has a viscosity of up to 50,000 centipoises at 25° C., C. a blowing agent,
D. a catalyst, and
E. a surfactant, and then II. permitting the reaction mixture to react thereby producing the foam.

15. A process for producing foam characterized by the presence of isocyanurate groups and by a friability of no greater than 21 percent, as measured by the ASTM C-421 friability test, said process comprising the steps of:

I. forming a reaction mixture of:
A. polymethylene polyphenyl isocyanate of the formula

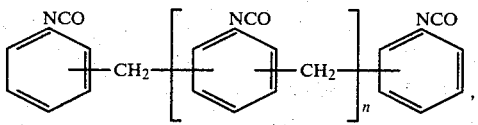

wherein n is an integer from 1 to 8 inclusive, wherein the polymethylene polyphenyl isocyanate contains less than 30% by weight diphenylmethane diisocyanate based on the total weight of polymethylene polyphenyl isocyanate, and wherein the polymethylene polyphenyl isocyanate has an NCO equivalent weight of 136 to 142, B. a furan resin of the formula

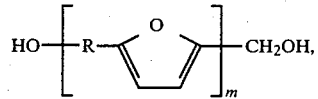

wherein R is —CH$_2$— or —CH$_2$—O—CH$_2$—, and the value of m is such that the furan resin has a viscosity between 8,000 and 45,000 centipoises at 25° C., C. a blowing agent comprising fluorotrichloromethane in an amount sufficient to give the resultant foam a bulk density of 1 to 5 pounds per cubic foot, D. a catalyst comprising 2,4,6-tris (dimethylaminomethyl) phenol and potassium-2-ethyl hexoate in an amount necessary to give the desired reactivity profile, comprising from 0.3 to 10 weight percent of the total composition, and E. a surfactant comprising a polydimethyl siloxanepolyoxyalkylene block copolymer, comprising from 0.1 to 2 weight percent of the composition, wherein the equivalent ratio of A:B is 3:1 to 6:1, and then, II. permitting the reaction mixture to react thereby producing the foam.

16. A laminate comprising a facing sheet having fixedly attached to one surface thereof a foam characterized by the presence of isocyanurate groups and by a friability of no greater than 21 percent, as measured by the ASTM C-421 friability test, the foam being the reaction product of:

A. polymethylene polyphenyl isocyanate and
B. a furan resin of the formula

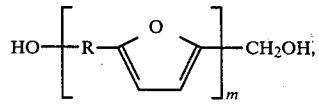

wherein R is —CH$_2$— or —CH$_2$—O—CH$_2$—, and the average value of m is such that the furan resin has a viscosity of up to 50,000 centipoises at 25° C.

17. A laminate comprising a foam having facing sheets fixedly attached to its upper and lower surfaces, the foam being characterized by the presence of isocyanurate groups and by a friability of no greater than 21 percent, as measured by the ASTM C-421 friability test, and being the reaction product of:

A. polymethylene polyphenyl isocyanate and
B. a furan resin of the formula

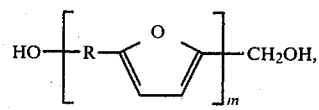

wherein R is —CH$_2$— or —CH$_2$—O—CH$_2$—, and the average value of m is such that the furan resin has a viscosity of up to 50,000 centipoises at 25° C.